United States Patent
Fitzgerald

(10) Patent No.: US 6,814,363 B2
(45) Date of Patent: Nov. 9, 2004

(54) VEHICLE SUSPENSION

(75) Inventor: Ian James Fitzgerald, Lower Hutt (NZ)

(73) Assignee: T.M.E. Limited, Lower Hutt (NZ)

( * ) Notice: Subject to any disclaimer, the term of this patent is extended or adjusted under 35 U.S.C. 154(b) by 121 days.

(21) Appl. No.: 10/073,883

(22) Filed: Feb. 14, 2002

(65) Prior Publication Data

US 2002/0117827 A1 Aug. 29, 2002

(30) Foreign Application Priority Data

Feb. 15, 2001 (NZ) .............................................. 509995

(51) Int. Cl.⁷ ................................................ B62D 7/18
(52) U.S. Cl. ........................ 280/93.512; 280/124.125; 280/124.154; 280/93.51
(58) Field of Search .................. 280/124.125, 124.154, 280/93.502, 771, 93.51, 787, 124.1, 124.117, 93.512

(56) References Cited

U.S. PATENT DOCUMENTS

| | | | | |
|---|---|---|---|---|
| 3,630,303 A | * | 12/1971 | Froumajou | 180/256 |
| 4,180,280 A | * | 12/1979 | Doveri | 280/277 |
| 4,487,429 A | * | 12/1984 | Ruggles | 280/521 |
| 4,648,623 A | * | 3/1987 | Cameron | 280/124.155 |
| 5,209,319 A | * | 5/1993 | Buell | 180/219 |
| 5,372,377 A | * | 12/1994 | Lee | 280/124.143 |
| 5,797,618 A | * | 8/1998 | Brokholc | 280/124.106 |
| 6,047,981 A | * | 4/2000 | Burrows | 280/276 |
| 6,152,472 A | * | 11/2000 | Woodside | 280/277 |
| 6,357,770 B1 | * | 3/2002 | Carpiaux et al. | 280/124.127 |
| 6,485,043 B2 | * | 11/2002 | Ito et al. | 280/276 |

* cited by examiner

Primary Examiner—Bryan Fischmann
Assistant Examiner—Brian Swenson
(74) Attorney, Agent, or Firm—Young & Thompson

(57) ABSTRACT

A vehicle suspension system wherein the main attachment to the chassis of the steering and suspension components is by the king pin mounting. The suspension system includes a first member attached directly to a shaft rotating with the chassis attachment; a second member attached to the first member by a swivel joint or a bush, allowing vertical movement of a stub axle attached solidly to the second member; and a third member attached to the first member which acts as the steering arm connection and load transference support for the forth member, a telescopic shock absorber and spring unit. The stub axle being at right angles to the king pin. Use of the suspension system allows a lessening or elimination of the toeing in or out of the wheels which commonly occurs with the vertical movement of the wheel.

20 Claims, 2 Drawing Sheets

VEHICLE SUSPENSION

FIELD OF THE INVENTION

The invention relates to a vehicle suspension, and in particular, one which forms part of the steering system. More preferably it relates to a front suspension and steering system.

BACKGROUND ART

It is also desirable to provide a compact and lightweight suspension system for small vehicles such as go-carts and ATV's.

Attempts to make suspension and steering systems for smaller vehicles such as go-carts and ATV's have resulted in movement of the plane of the wheels during steering, and vertical bump movement, resulting in the wheels either toeing in or toeing out.

OBJECT OF THE INVENTION

It is an object of this invention to provide an improved steering-suspension system or one which at least provides the public with a useful choice.

STATEMENT OF INVENTION

In one aspect the invention provides a steering and suspension system having a kingpin capable of being fixed relative to the vehicle chassis, and a shaft rotatable on the kingpin axis that is capable of being attached to a steering system. Preferably the steering and suspension system includes a component capable of attachment to a wheel via a stub axle or other means and also connectable to the rotatable shaft in such a manner that it can move in a similar vertical position to the kingpin axis.

In another aspect the invention provides an independent suspension-steering system as outlined above and her including a shock absorber.

In a yet further aspect the invention provides an independent steering-suspension system including a kingpin capable of being fixed relative to a vehicle chassis, a first member rotatable about the axis of the kingpin, a second member capable of being secured to the first member so that it is rotatable relative to the first member about an axis (which axis is preferably normal to the axis of the kingpin) and also rotatable about the axis of the kingpin, a stub axle capable of being secured to the second member, a third member rotatable about the axis of the kingpin, whereby in use the independent steering-suspension system substantially eliminates toe and bump-steer.

Preferably the independent steering-suspension system as described above in the immediately preceding paragraph also includes a fourth member having a spring and damping elements and capable of being secured to the second and third members and preferably rotatable relative to the second and third members about axes normal to the axis of the kingpin and rotatable about the axis of the kingpin, and linkage means capable of transferring the steering effort to the first, second, third and fourth members as rotation about the kingpin axis, thereby providing steering action.

In its most preferred form the independent steering-suspension system is capable of use as the front suspension/steering system of a vehicle. More preferably the vehicle is a go-cart, ATV or other small vehicle. However the system of the invention can be used in vehicles of any size.

BRIEF DESCRIPTION OF DRAWINGS

Various embodiments of the present invention are described, by way of example only, in the accompanying drawings.

DESCRIPTION

In the following examples, the steering/suspension components will be described as if they were fixed to a vehicle chassis, as it is desirable to explain the operation of the steering/suspension system, when installed on a vehicle. However it will be appreciated that the invention covers the components, sold as a subassembly, or the components designed to be assembled together to form a subassembly, or to be assembled in situ on the vehicle.

EXAMPLE 1

Figure 1:
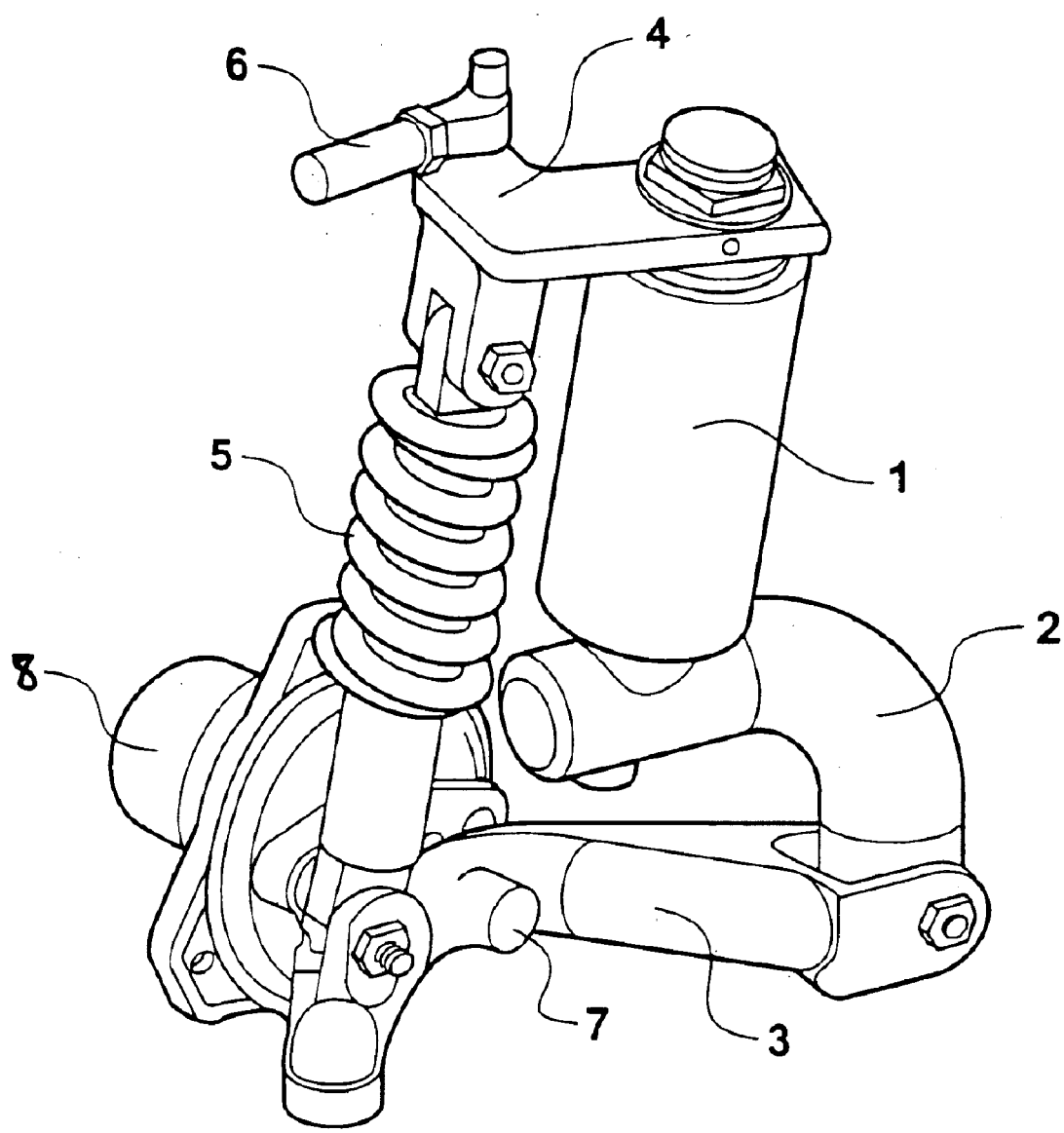
FIG. 1 illustrates the key members of the steering and suspension system.

Referring to FIG. 1, the main attachment to the chassis of the steering and suspension components is by the king pin mounting (1). This is the axis about which the suspension members rotate.

The first member (2) is attached directly to a shaft rotating within the chassis attachment 1. The second member (3) is attached to (2) by means of a swivel joint or bush, allowing vertical movement of a stub axle (7) attached solidly to (3). The vehicle wheel is attached to this stub axle by a rotating hub assembly (8).

The third member (4) is attached to (2) and acts as the steering arm connection to the steering linkage and load transference support for the fourth member (5), a telescopic shock absorber and spring unit.

When the vehicle's steering wheel is turned, via the steering box, rack and pinion or direct linkage, the arm (4) is rotated by the track rod (6). As (4) is connected directly to (2) (3) and (5), the complete unit moves as one.

The steering mechanism of the vehicle can be set in a horizontal plane with (4). Any vertical movement of the wheel will not alter this plane as the movement is absorbed and taken up by the flexible attachment of (3) and (5) to (2) and (4).

As there is no vertical movement with (4) while it is being rotated there is no vertical arching of the attached steering track rod (6) and therefore no influence on the position of the attached wheel in relation to the centre line of the vehicle. Thus the common occurrence of the wheels toeing in or out, caused by the stewing linkage, with vertical movement of the wheel is eliminated.

EXAMPLE 2

Figure 2:
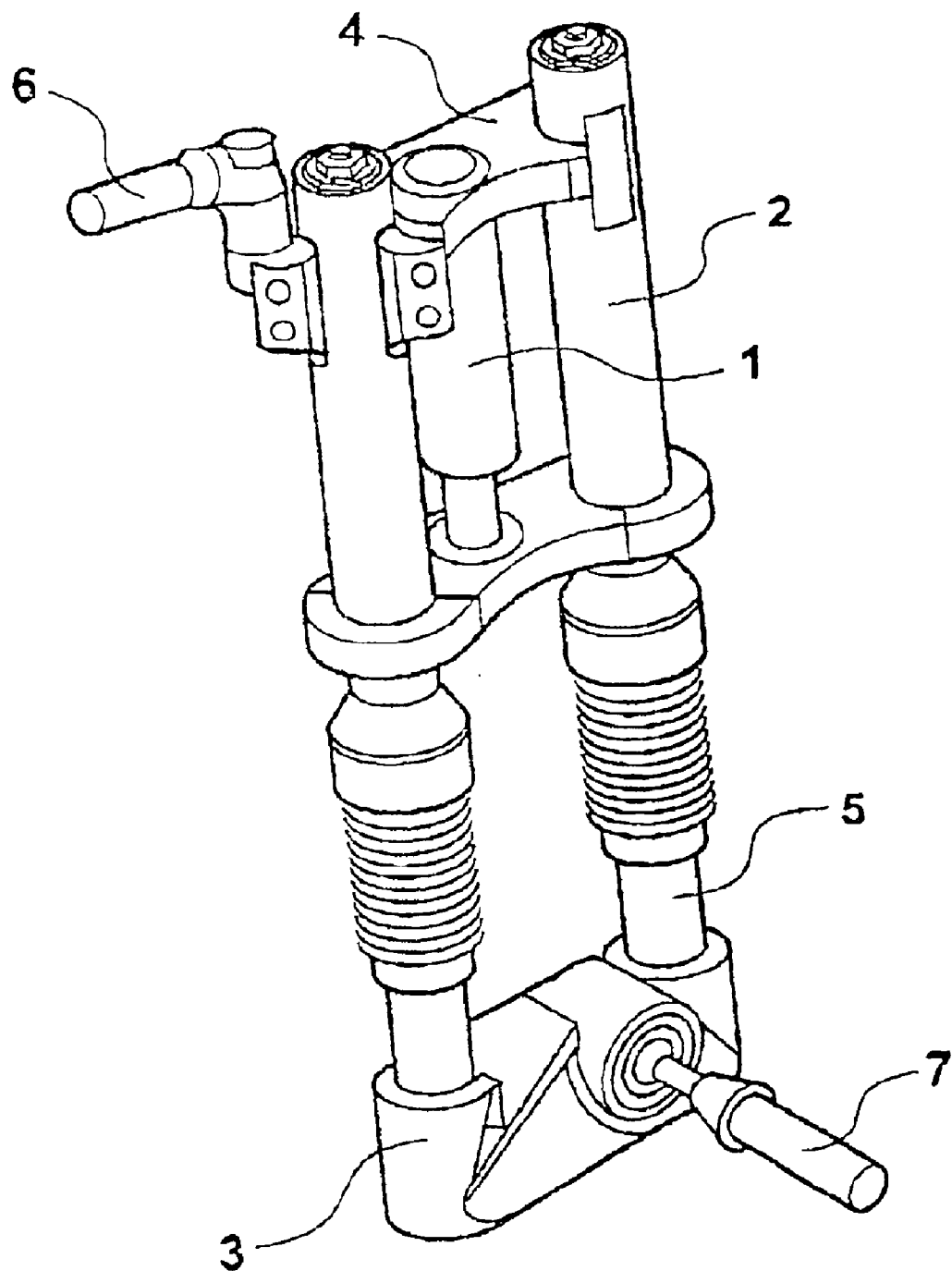
FIG. 2 illustrates a further embodiment on the invention where the members are combined to form common members.

Referring to FIG. 2, this embodiment of the invention combines members 1 and 3, plus members 2 and 4.

The attachment (1) is directly to the chassis.

Component (2) and (4) are physically joined together either permanently or attachably. This combined unit rotates about the axis of (1) and is moved via the track rod (6).

Vertical movement is achieved by (5), the fourth member moving inside (2). The shock absorber element is contained within (2) coupled with the spring, or alternatively the spring can be mounted externally over (5).

The second member (3) is attached to (5) and to this is mounted the stub axle (7).

ADVANTAGES

The examples of this invention provide a compact combined steering/suspension system capable of being used as the front suspension for vehicles, whilst at the same time minimising the occurrence of "bump-steer" and eliminating any toe-in/out influence of the steering linkage.

VARIATIONS

The two examples of this invention show two different ways of assembling the components to provide a combined steering/suspension system. A number of variations are possible whilst still allowing the vehicle's wheels to accommodate vertical movement, without toeing in or toeing out during steering. Although the primary use of the preferred examples is that of a front suspension and steering sub-assembly for a go-cart, ATV or other vehicle, it is equally possible that this sub-assembly could be used for rear wheel steering or for all wheel steering or for The steering of a single wheel of a motorcycle or tricycle.

It will therefore be appreciated that various alterations or modifications may be made to the foregoing without departing from the spirit or scope of this invention.

What is claimed is:

1. In a vehicle having a chassis, a steering system comprising a pair of outwardly extending track rods, two wheels mounted for rotation on respective suspension subassemblies, each suspension subassembly comprising:

a king pin fixed at a predetermined angle to the chassis;

a steering arm connected to a respective track rod and configured to rotate about a king pin axis upon movement of the respective track rod and constrained so that said steering arm cannot move in an axial direction of the king pin;

a wheel support member arranged for rotational movement about the king pin axis when the steering arm moves and comprising a member for rotating a respective wheel for rotation, the wheel support member mounted for reciprocal movement substantially in the axial direction of the king pin, such that movement relative to the chassis of a wheel carried by the wheel support member does not cause movement of a respective steering arm in the axial direction of the respective king pin, said movement of the respective steering arm being with respect to the respective king pin, thereby substantially eliminating toe and bump steer.

2. A vehicle as claimed in claim 1, wherein the rotational axis of each wheel is transverse to the respective king pin axis.

3. A vehicle as claimed in claim 2, wherein the rotational axis of each wheel intersects with the respective king pin axis.

4. A vehicle as claimed in claim 3, wherein the reciprocal movement of the wheel support member is substantially linear.

5. A vehicle as claimed in claim 1, wherein each suspension subassembly comprises a telescoping member attached to the steering arm and the wheel support member to provide the reciprocal movement of the wheel support member.

6. A vehicle as claimed in claim 5, wherein each telescoping member further comprises a spring.

7. A vehicle as claimed in claim 6, wherein each suspension subassembly further comprises a shock absorber.

8. A vehicle as claimed in claim 7, wherein the shock absorber is mounted within the telescoping member.

9. A vehicle as claimed in claim 8, wherein each suspension subassembly comprises two telescoping members attached to the steering arm, and wherein the wheel support member extends between the telescoping members.

10. A vehicle as claimed in claim 9, wherein the telescoping members in each suspension subassembly are substantially coplanar in a plane that is substantially aligned with a rolling direction of the respective wheel.

11. A vehicle as claimed in claim 1, wherein each king pin comprises a sleeve fixed to the chassis and a shaft rotatable within the sleeve, and wherein the steering arm is attached to the shaft.

12. A vehicle as claimed in claim 11, wherein each suspension subassembly further comprises a first member attached to the shaft, said first member being mounted to the king pin and rotatable about the king pin axis when the steering arm rotates, the wheel support member being pivotally attached to the first member and rotatable about the king pin axis, and a fourth member pivotally attached to the support member and pivotally attached to the steering arm.

13. A vehicle as claimed in claim 12, wherein each wheel support member is pivotally attached to the respective first member at a pivot axis which is normal to the king pin axis.

14. A vehicle as claimed in claim 13, wherein each fourth member comprises at least one spring and a damping element.

15. A vehicle as claimed in claim 14, wherein each fourth member is pivotally attached to the steering arm and pivotally attached to the wheel support member at pivot axes which are normal to the king pin axis.

16. A vehicle as claimed in claim 11, wherein each steering arm is attached to the respective king pin shaft in a substantially perpendicular orientation.

17. A vehicle as claimed in claim 1, wherein said wheels are front wheels.

18. A vehicle as claimed in claim 17, further comprising at least one rear wheel for supporting the chassis.

19. A vehicle as claimed in claim 1, wherein said member for mounting the respective wheel comprises a stub axle or a hub.

20. A vehicle as claimed in claim 1, wherein the vehicle is a go-kart or ATV.

* * * * *